US012428932B1

(12) United States Patent
Fripp et al.

(10) Patent No.: US 12,428,932 B1
(45) Date of Patent: Sep. 30, 2025

(54) SENSING A DC POWER PARAMETER OF AN ELECTROMAGNETIC ASSEMBLY OF A DOWNHOLE DEVICE TO ESTIMATE THE STATUS OR HEALTH THEREOF (71) Applicant: Halliburton Energy Services, Inc., Houston, TX (US)

(72) Inventors: Michael Linley Fripp, Singapore (SG); Mohan Gunasekaran, Singapore (SG); David Allen Dockweiler, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/732,906

(22) Filed: Jun. 4, 2024

(51) Int. Cl.
*E21B 34/06* (2006.01)
*F16K 31/02* (2006.01)
*F16K 37/00* (2006.01)

(52) U.S. Cl.
CPC ........ *E21B 34/066* (2013.01); *F16K 37/0041* (2013.01); *E21B 2200/06* (2020.05)

(58) Field of Classification Search
CPC .............. E21B 34/066; E21B 2200/05; E21B 2200/06; F16K 31/02; F16K 31/0675; F16K 27/029; F16K 27/048
See application file for complete search history.

(56) References Cited

U.S. PATENT DOCUMENTS

| 3,958,450 | A | | 5/1976 | Kleesattel | |
|---|---|---|---|---|---|
| 4,321,946 | A | * | 3/1982 | Paulos | F16K 37/0041 166/66.4 |
| 7,640,989 | B2 | * | 1/2010 | Williamson, Jr. | E21B 34/066 166/66.5 |
| 11,002,367 | B2 | * | 5/2021 | Pratt | F16K 31/082 |
| 11,248,441 | B2 | * | 2/2022 | Vick, Jr. | E21B 34/10 |
| 11,286,747 | B2 | * | 3/2022 | Tiwari | E21B 34/066 |
| 11,732,551 | B1 | * | 8/2023 | Tang | E21B 34/14 166/373 |
| 2003/0126980 | A1 | | 7/2003 | Barden | |
| 2009/0244801 | A1 | | 10/2009 | Yang | |
| 2011/0120728 | A1 | | 5/2011 | Lake et al. | |
| 2013/0248203 | A1 | | 9/2013 | Scott et al. | |

(Continued)

*Primary Examiner* — Kenneth L Thompson
(74) *Attorney, Agent, or Firm* — Scott Richardson; Parker Justiss, P.C.

(57) ABSTRACT

Provided is a downhole device, a well system, and a method. The downhole device, in one aspect, includes an electromagnetic assembly, as well as a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target. The downhole device, according to this aspect, further includes a sensor electrically coupled to the electromagnetic assembly, the sensor configured to sense for a change in a DC power parameter powering the electromagnetic assembly as the electromagnetic assembly and magnetic target physically couple to or physically decouple from one another, the sensed change representative of a change of impedance within a coil of the electromagnetic assembly and employable to estimate the status or health of the downhole device.

23 Claims, 8 Drawing Sheets

(56) References Cited

U.S. PATENT DOCUMENTS

2013/0341034 A1* 12/2013 Biddick ................ F16K 31/06
                                                                               166/373
2014/0117911 A1    5/2014  Lamprell
2020/0032616 A1    1/2020  Vick, Jr. et al.

* cited by examiner

SENSING A DC POWER PARAMETER OF AN ELECTROMAGNETIC ASSEMBLY OF A DOWNHOLE DEVICE TO ESTIMATE THE STATUS OR HEALTH THEREOF

BACKGROUND

Downhole devices, such as safety valves (e.g., downhole subsurface safety valves (SSSVs)), are well known in the oil and gas industry and provide one of many failsafe mechanisms to prevent the uncontrolled release of subsurface production fluids, should a wellbore system experience a loss in containment. In certain instances, safety valves comprise a portion of a tubing string, the entirety of the safety valve being set in place during completion of a wellbore. In other instances, the safety valves are wireline deployed/retrieved. Although a number of design variations are possible for safety valves, the vast majority are flapper-type valves that open and close in response to longitudinal movement of a flow tube.

Since safety valves typically provide a failsafe mechanism, the default positioning of the flapper valve is usually closed in order to minimize the potential for inadvertent release of subsurface production fluids. The flapper valve can be opened through various means of control from the earth's surface in order to provide a flow pathway for production to occur. What is needed in the art is an improved downhole device that does not encounter the problems of existing downhole devices.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to a direct interaction between the elements and may also include an indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

In various examples, only certain ranges are explicitly disclosed herein. However, ranges from any lower limit may be combined with any upper limit to recite a range not explicitly recited. Similarly, ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The present disclosure has developed a downhole device that allows the user to obtain critical information on the coupling and/or decoupling of an electromagnetic assembly and a magnetic target (e.g., ferromagnetic target) thereof, as well as predict the health of such a downhole device, advantageously without a downhole sensor. While the present disclosure has found particular advantages in obtaining the critical information on the coupling and/or decoupling of an electromagnetic assembly and a magnetic target of a safety valve, such as an SSSV, the inventive aspects of the present disclosure may advantageously be employed with any downhole device (e.g., electromagnetic latch, electromagnetic catch, electromagnetic brake, etc.) employing an electromagnetic assembly and associated magnetic target.

The present disclosure has recognized, for the first time, that a change in counter-electromotive force (CEMF) produced by the electromagnetic assembly as the electromagnetic assembly initially couples with (e.g., or decoupled from) the magnetic target may be measured, and thus be used to estimate the status (e.g., coupled or decoupled) or health of the downhole device. The CEMF, sometimes called a back-EMF or an induced-EMF, is the electromotive force that manifests as a voltage that opposes the change in current that induced it. The CEMF is produced by the induced magnetic energy from the electromagnetic assembly.

The present disclosure has further recognized that this change in CEMF may be generated, and thus sensed, using a variety of different mechanisms. In at least one embodiment, the electromagnetic assembly is powered with DC power. Take for example, a situation wherein the electromagnetic assembly and the magnetic target are decoupled from one another, and the electromagnetic assembly receives the DC power of a constant 14 volts and a current of approximately 1.251 amps. Such a situation implies that the resistance in the coil(s) of the electromagnetic assembly is approximately 11.2 ohms. The present disclosure has recognized that as the electromagnetic assembly and the magnetic target initially make contact, the changing magnetic field within the magnetic target generates a CEMF. For instance, before contact there was little or no magnetic field in the magnetic target. Similarly, after prolonged contact there is a fixed large amount of magnetic field in the magnetic target. However, at the moment of contact there is a changing amount of magnetic field in the magnetic target, which thus generates the CEMF.

In the above example embodiment, at the moment of contact the current drops (e.g., to approximately 1.017 amps in the example given), which implies that the resistance in the coil(s) of the electromagnetic assembly increases (e.g., to approximately 13.77 ohms in the example given). Notwithstanding, after the magnetic field has stabilized in the magnetic target, the current and the impedance in the coil(s) return to the original values (e.g., or at least close to them). Moreover, the moment that the electromagnetic assembly and the magnetic target decouple from one another (e.g., while the electromagnetic assembly is still receiving the DC power), the current increases (e.g., to approximately 1.51 amps in the example given), which implies that the resistance in the coil(s) of the electromagnetic assembly decreased (e.g., to approximately 9.27 ohms in the example given).

With the foregoing DC power source embodiment (e.g., DC power constant voltage application), a sensor may be electrically coupled to the electromagnetic assembly, the sensor configured to sense for a change in a DC power parameter powering the electromagnetic assembly, for example that will arise the moment the electromagnetic assembly and the magnetic target physically couple to or physically decouple from one another. In at least one embodiment, the physical coupling is a physical connection and an attractive force (e.g., magnetic force) maintaining that physical connection, and further the physical decoupling is a lack of attractive force (e.g., magnetic force) and thus lack of physical connection.

In one or more embodiments, the sensed change would be representative of a change of impedance within the coil of the electromagnetic assembly, and could be employable to estimate the status (e.g., coupled or decoupled) or health of the downhole device.

In at least one embodiment of the DC power source application, the sensor is a current sensor configured to sense for a change (e.g., drop) in current the moment the electromagnetic assembly and the magnetic target physically couple to one another, the sensed change in current indicating that the electromagnetic assembly has engaged with the magnetic target. In at least one other embodiment of the DC power source application, the sensor is a current sensor, the current sensor configured to sense for an increase in current the moment the electromagnetic assembly and the magnetic target physically decouple from one another, the sensed increase in current indicating that the electromagnetic assembly has disengaged from the magnetic target. In yet another embodiment of the DC power source application, the sensor is a power sensor, the power sensor configured to sense for a change in power the moment the electromagnetic assembly and the magnetic target physically couple to one another, the sensed change in power indicating that the electromagnetic assembly has engaged with the magnetic target. In yet another embodiment of the DC power source application, the sensor is a power sensor, the power sensor configured to sense for an increase in power the moment the electromagnetic assembly and the magnetic target physically decouple from one another, the sensed increase in power indicating that the electromagnetic assembly has disengaged from the magnetic target. Alternatively, a ratio of the voltage and current, among other DC power parameters, may be sensed, and thus could be employable to estimate the status (e.g., coupled or decoupled) or health of the downhole device.

In at least one other alternative embodiment, an AC signal is applied to the electromagnetic assembly. For example, an AC ripple signal could be applied on top of the DC power. Accordingly, the DC power would essentially be powering the electromagnetic assembly, wherein the AC ripple signal would be used to create the changing magnetic field. In this embodiment, when the electromagnetic assembly and the magnetic target initially make contact, a CEMF is generated within the magnetic target because of the changing magnetic field created by the AC ripple signal. Similarly, eddy currents will form in the magnetic target, which will be true for as long as the electromagnetic assembly is physically coupled with the magnetic target. Nevertheless, when the electromagnetic assembly is not in contact with the magnetic target, there is no CEMF, and there are no eddy currents.

Thus, in at least one embodiment, an AC signal may be applied to the electromagnetic assembly, and a change in AC signal parameter may be sensed to determine whether the electromagnetic assembly and magnetic target are physically coupled to one another or physically decoupled from one another. In at least one embodiment, the change in AC signal parameter is a change in impedance. For example, AC electrical impedance will be different depending on whether the electromagnetic assembly and magnetic target are physically coupled to one another or physically decoupled from one another.

The impedance of the electromagnetic assembly may be calculated with:

$$|Z| = \sqrt{R^2 + (\omega L^2)}$$

wherein Z is the impedance, R is the DC resistance of the coil, ω is the frequency, and L is the inductance. In accordance with this embodiment, the inductance, L, changes as the proximity of the electromagnetic assembly to the magnetic target changes. In at least this one embodiment, the AC signal may be driven at any frequency between 10 Hz and 1 MHz, if not between 50 Hz and 20 kHz.

With the foregoing AC signal embodiment (e.g., AC ripple signal application), a sensor may be electrically coupled to the electromagnetic assembly, the sensor configured to sense for a change in an AC signal parameter imparted upon the electromagnetic assembly. For example, the sensor can detect changes in an electromagnetic parameter that will arise when the electromagnetic assembly and the magnetic target physically are coupled to or physically decouple from one another. In another example, the electromagnetic parameter is a function of the eddy currents in the magnetic target that have been induced by the electromagnetic assembly. In one or more embodiments, the sensed change would be representative of a change of impedance within the coil of the electromagnetic assembly, and could be employable to estimate the status (e.g., coupled or decoupled) or health of the downhole device.

In at least one embodiment of the AC signal embodiment, the sensor is an inductance sensor configured to sense for a change in inductance when the electromagnetic assembly and the magnetic target physically couple to one another, the sensed change in inductance indicating that the electromagnetic assembly has engaged with the magnetic target. In at least one other embodiment, the sensor is a voltage sensor configured to sense for a change in induced voltage the moment the electromagnetic assembly and the magnetic target physically couple to one another, the sensed change in inductance indicating that the electromagnetic assembly has engaged with the magnetic target.

The DC power parameter sensor and/or AC signal parameter sensor may be positioned at various different locations within the wellbore. In at least one embodiment, the DC power parameter sensor and/or AC signal parameter sensor forms a part of the downhole device, and thus is located within the confines of the wellbore. In yet another embodiment, the DC power parameter sensor and/or AC signal parameter sensor does not form a part of the downhole device, but is still located within the confines of the wellbore. In even yet another embodiment, the DC power parameter sensor and/or AC signal parameter sensor is located at a surface of the wellbore, or alternatively any distance above the surface of the wellbore. This last embodiment (e.g., wherein the DC power parameter sensor and/or AC signal parameter sensor is located at or above the surface of the wellbore) is particularly appealing, as it would enable a situation wherein the downhole device would be void of any other downhole electronics other than the electromagnetic assembly. For example, in the embodiment wherein the downhole device is a safety valve (e.g., such as a SSSV), the safety valve could be entirely operated, and its status and/or health checked, with the electromagnetic assembly being its only downhole electronic assembly.

Figure 1:
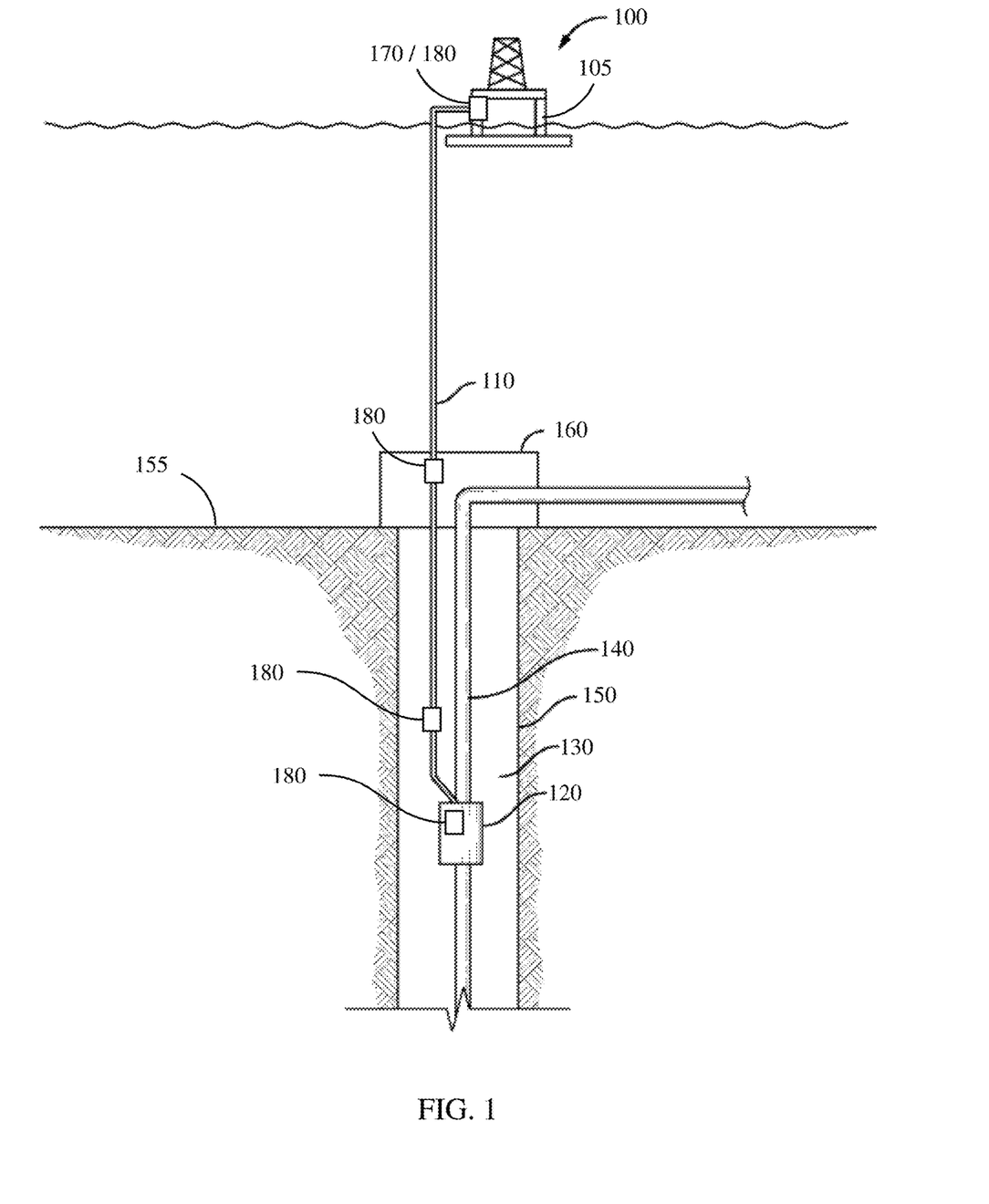
FIG. 1 illustrates a well system designed, manufactured and/or operated according to one or more aspects of the disclosure.

Turning to FIG. 1, illustrated is a well system 100 designed, manufactured and/or operated according to one or more aspects of the disclosure. In the illustrated embodiment, the well system 100 includes an offshore platform 105 connected to a downhole device 120 (e.g., a downhole device including an electromagnetic assembly and magnetic target, such as a safety valve or SSSV) via electrical connection 110. An annulus 130 may be defined between walls of wellbore 150 and a conduit 140. A wellhead 160, for example positioned at the surface 155 of the wellbore 150, may provide a means to hand off and seal conduit 140 against wellbore 150 and provide a profile to latch a subsea blowout preventer to. The conduit 140 may be coupled to wellhead 160. The conduit 140 may be any conduit such as a casing, liner, production tubing, or other tubulars disposed in a wellbore. While the electrical connection 110 is illustrated as being connected to an offshore platform, the electrical connection 110 may be connected to any type of completion without departing from the disclosure. In at least one embodiment, the electrical connection 110 is a tubing encapsulated conductor (TEC).

The downhole device 120 may be interconnected in conduit 140 and positioned in wellbore 150. The downhole device 120 may provide a means to isolate a lower portion of conduit 140 from an upper portion of conduit 140. The lower portion of conduit 140 may be fluidically connected to a subterranean formation, such that formation fluids may flow into the lower portion of conduit 140. The electrical connection 110 may extend into the wellbore 150 and may be connected to the downhole device 120. The electrical connection 110 may provide power to an electromagnetic assembly disposed within the downhole device 120. As will be described in further detail below, power provided to the electromagnetic assembly may energize the electromagnetic assembly to hold components of downhole device 120 in place when downhole device 120 is actuated into an open position. Actuation may include opening the downhole device 120 to provide a flow path for wellbore fluids in a lower portion of conduit 140 to flow into an upper portion of conduit 140. The electrical connection 110 may also provide a means to close downhole device 120 and isolate a lower portion of conduit 140 to flow from an upper portion of conduit 140 to provide well control, for example when power is cut to the electrical connection 110.

In accordance with one or more embodiments of the disclosure, the well system 100 may further include a power source 170, for example coupled to the downhole device 120 (e.g., DC power source, AC power source, DC power source with overlayed AC signal, etc.) using the electrical connection 110. In accordance with one or more embodiments of the disclosure, the well system 100 may further include a DC power parameter sensor and/or AC signal parameter sensor 180 designed, manufactured and/or operated according to one or more embodiments of the disclosure. The DC power parameter sensor and/or AC signal parameter sensor 180, in one or more embodiments, may form at least a portion of the downhole device 120, and thus be located within the wellbore 150. In yet another embodiment, as also shown, the DC power parameter sensor and/or AC signal parameter sensor 180 is still located within the wellbore 150, but does not form a portion of the downhole device 120. In even yet another embodiment, as also shown, the DC power parameter sensor and/or AC signal parameter sensor 180 may be located at or above the surface 155 of the wellbore 150, whether proximate the wellhead 160, proximate the offshore platform 105, or another location. As discussed in detail above, the DC power parameter sensor and/or AC signal parameter sensor 180 may be employed to estimate the status or health of the downhole device 120, and more specifically the electromagnetic assembly of the downhole device 120.

Turning to FIGS. 2A through 2F, illustrated are different views of a downhole device 200 designed, manufactured and/or operated according to one or more embodiments of the disclosure during different operational states. In the illustrated embodiment of FIGS. 2A through 2F, the downhole device 200 is a safety valve, such as an SSSV. Nevertheless, any downhole device employing an electromagnetic assembly and magnetic target could easily employ the inventive aspects of the present disclosure. Accordingly, unless otherwise required, the present disclosure should not be limited to any type of downhole device.

Figure 2A:
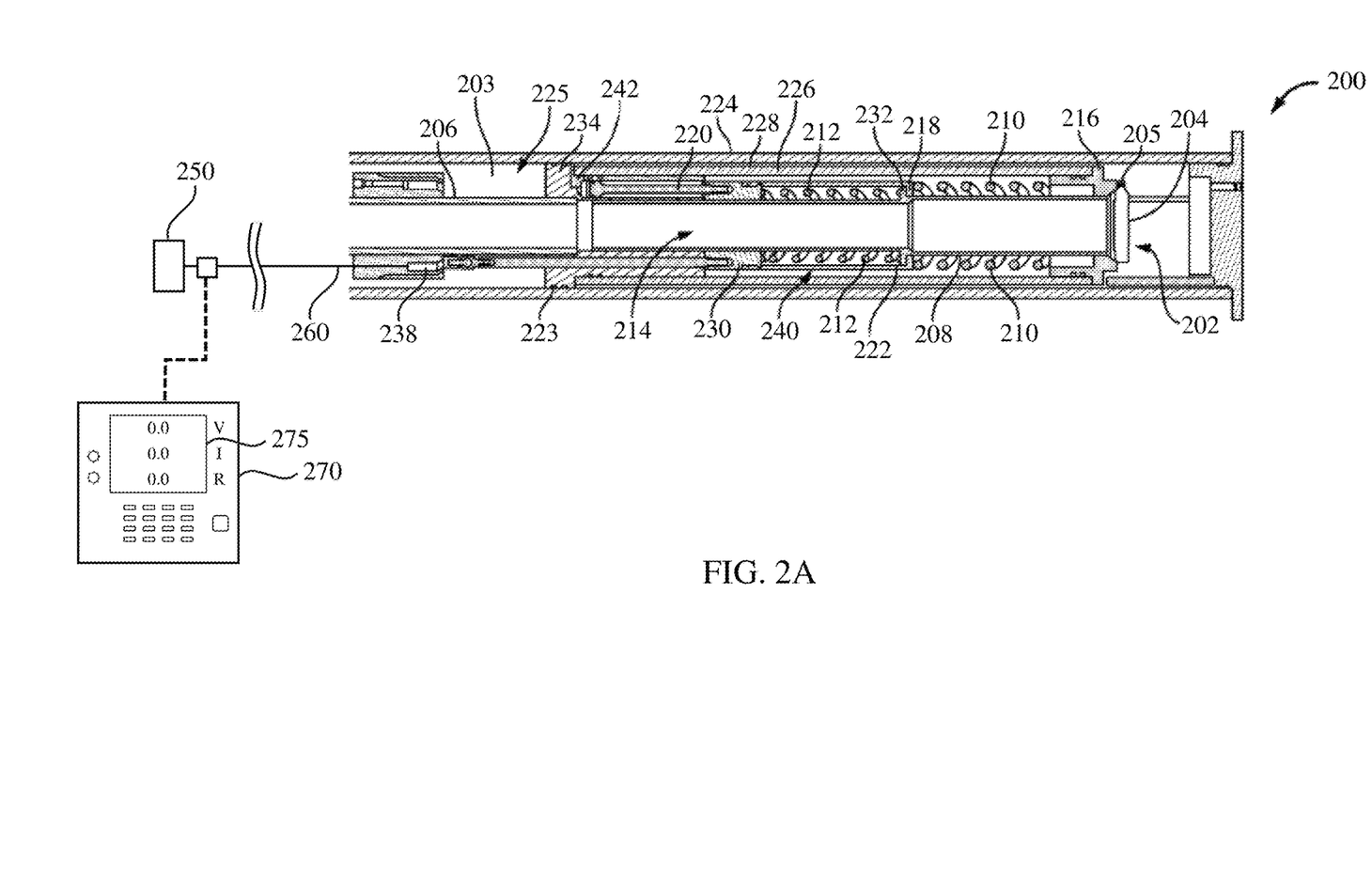
FIGS. 2A through 2F illustrate different views of a downhole device designed, manufactured and/or operated according to one or more embodiments of the disclosure during different operational states.
Figure 2B:
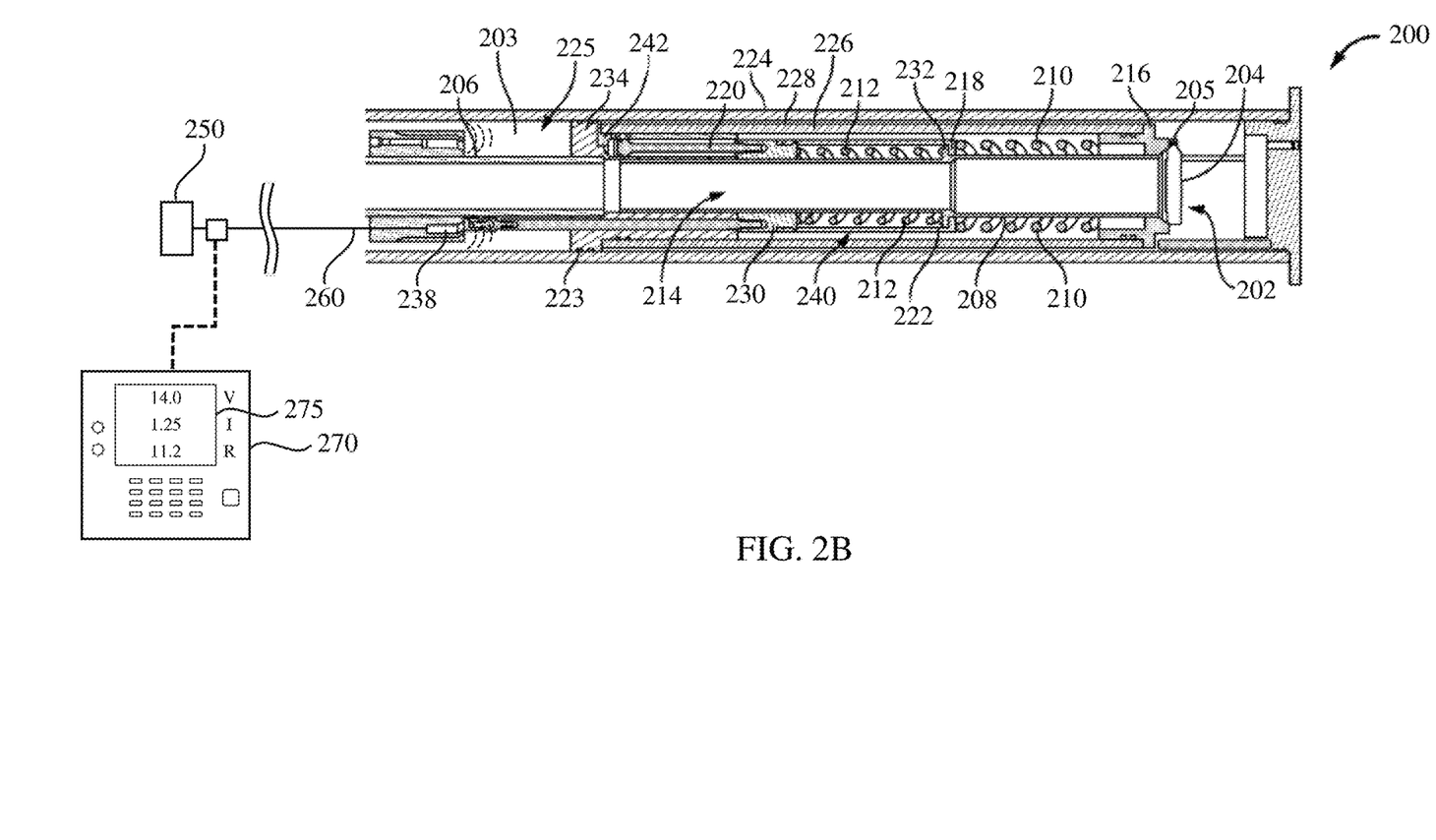
Figure 2C:
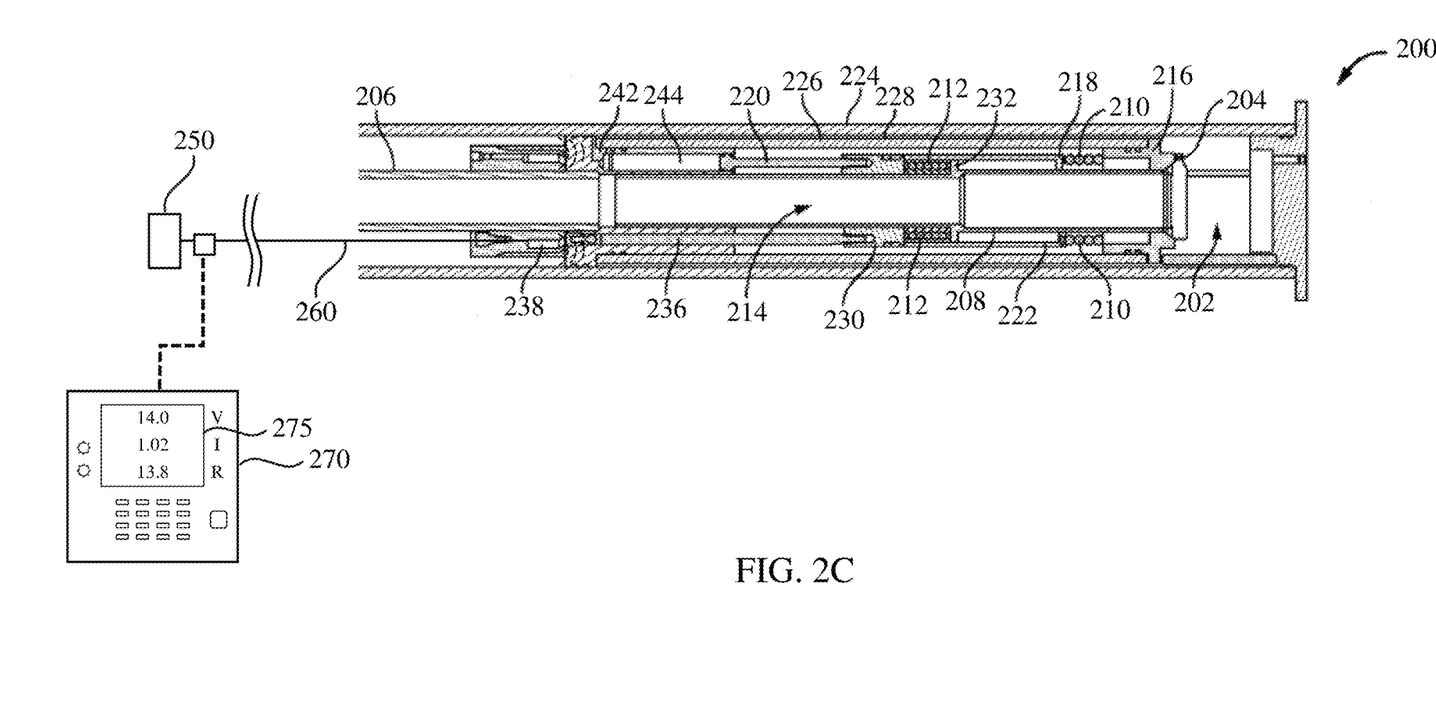
Figure 2D:
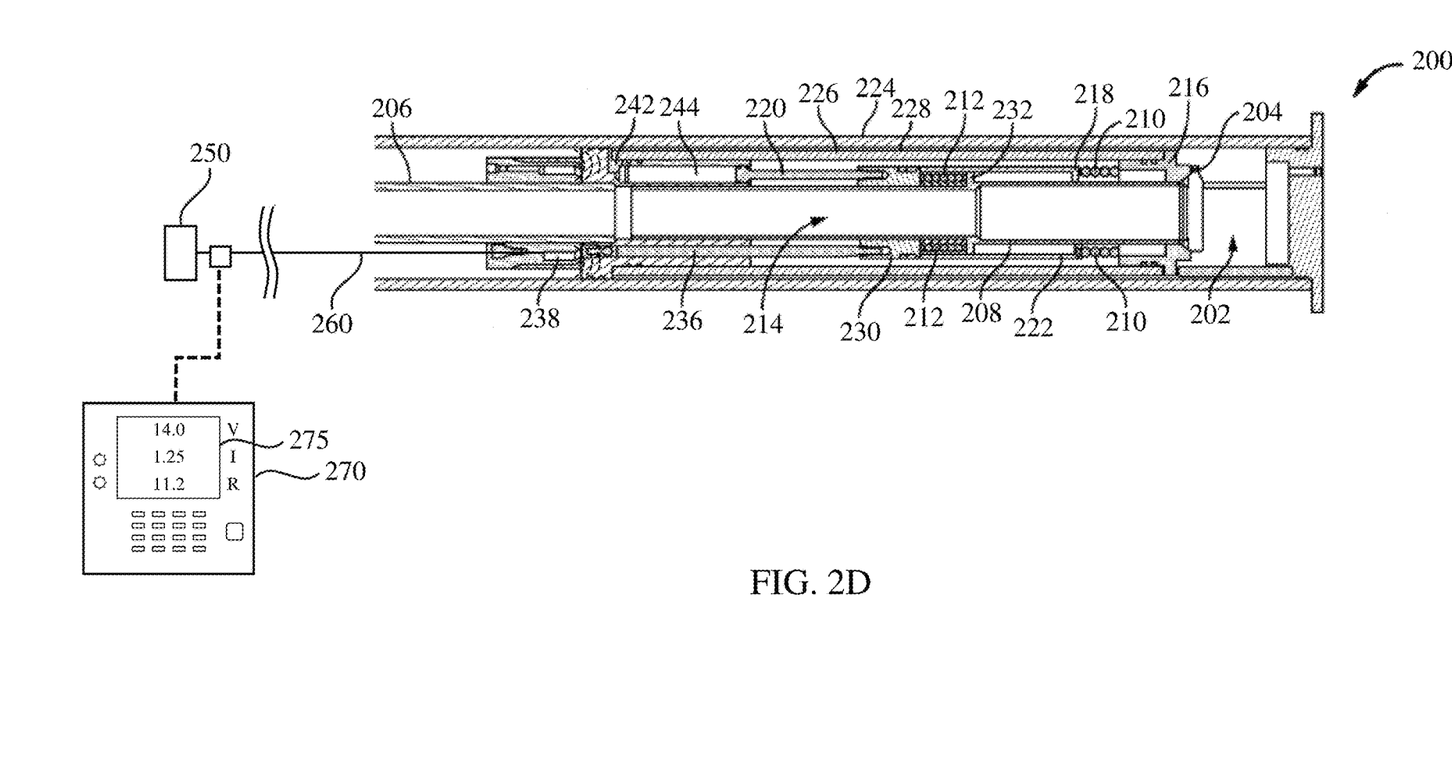
Figure 2E:
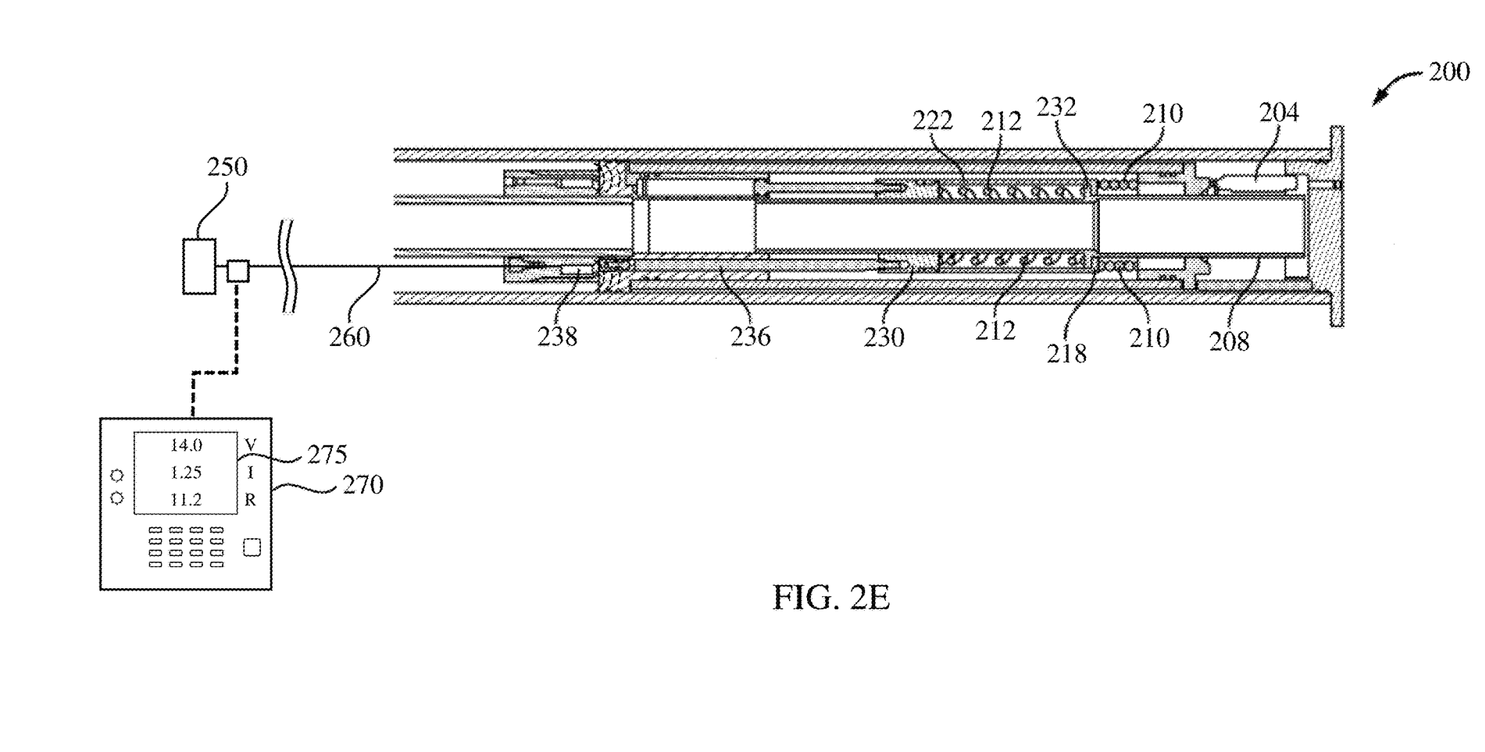
Figure 2F:
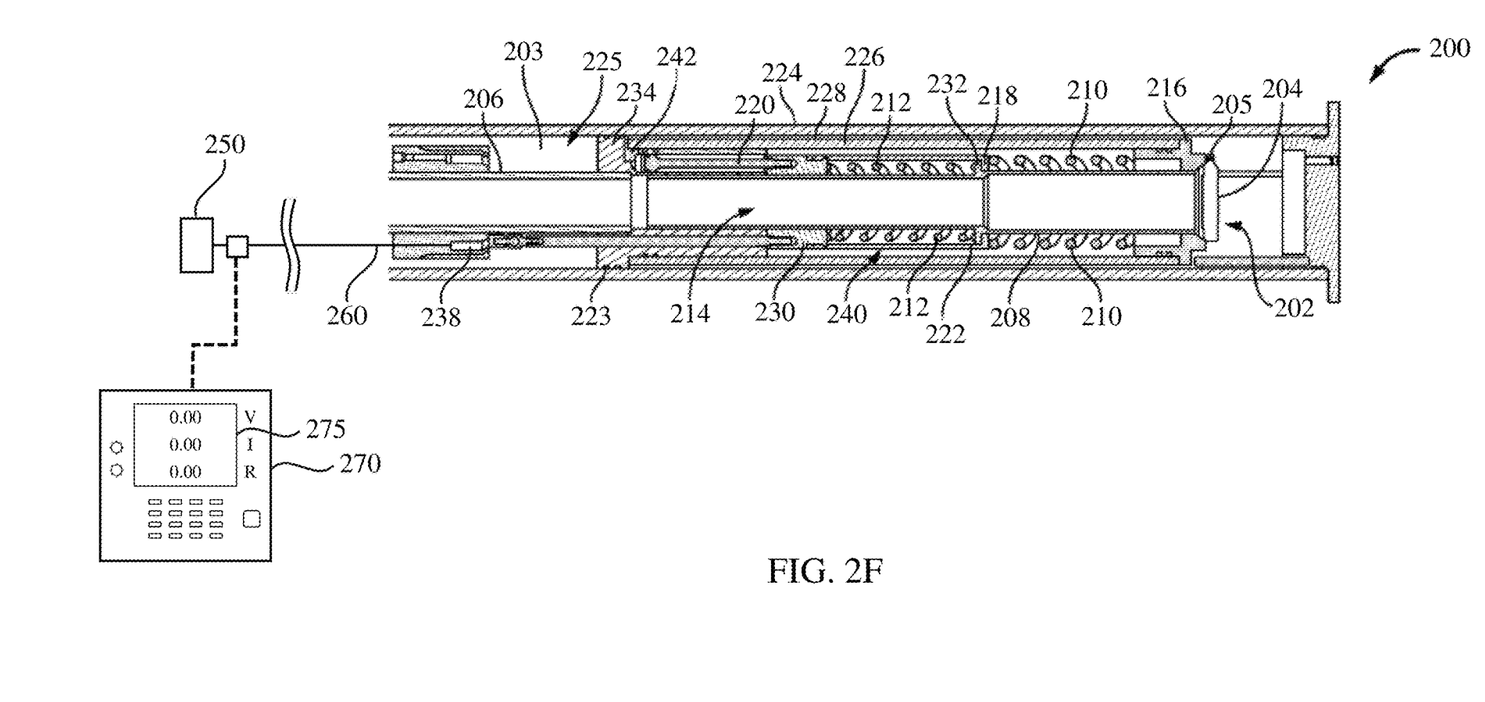

FIG. 2A illustrates the downhole device 200 in a first closed position, its unpowered electromagnetic assembly and magnetic target decoupled from one another. FIG. 2B illustrates the downhole device 200 of FIG. 2A with power (DC power in this embodiment) supplied to the electromagnetic assembly. FIG. 2C illustrates the downhole device 200 of FIG. 2B but now in a second closed position, and specifically the moment when its powered (DC powered) electromagnetic assembly and magnetic target couple with one another, and thus the magnetic field in the magnetic target is in a state of change. FIG. 2D illustrates the downhole device 200 of FIG. 2C after the magnetic field applied to the magnetic target is at a steady state (e.g., no longer in a state of change). FIG. 2E illustrates the downhole device 200 of FIG. 2D now in an open position, the powered (DC powered) electromagnetic assembly and magnetic target magnetically coupled (e.g., fixedly coupled) with one another. FIG. 2F illustrates the downhole device 200 of FIG. 2E after power (DC power) has been cut to the electromagnetic assembly, and thus the downhole device 200 returns to the first closed position.

Referring to FIG. 2A, the downhole device 200 is illustrated in a first closed position. The downhole device 200, in one or more embodiments, may include a tubular housing 224 containing a bore 225 therein, wherein components of the downhole device 200 may be disposed within the bore 225. An upper valve assembly 234 (e.g., also the magnetic target in this embodiment) may be attached to the tubular housing 224, and may further include sealing element 223 such that fluid communication from lower section 202 to upper section 203 is prevented.

A sleeve 226 may be attached to the upper valve assembly 234 and the lower valve assembly 216. A flow tube 240 may be disposed within the sleeve 226. The flow tube 240 may include a translating sleeve 222 and a flow tube main body 208. A flow path 214 may be defined by an interior of the flow tube main body 208. As illustrated in FIG. 2A, the flow path 214 may extend from an interior of the conduit 206 through an interior of the flow tube main body 208. As will be discussed in further detail below, when the downhole device 200 is in an open position, the flow path 214 may extend from an interior of the conduit 206 through an interior of the flow tube main body 208 and further into the lower section 202.

The downhole device 200 may further include a power spring 210 disposed between the lower valve assembly 216 and a translating sleeve shoulder 218. As illustrated in FIG. 2A, the translating sleeve shoulder 218 and a flow tube shoulder 232 may be in contact when the downhole device 200 is in the first closed position. The power spring 210 may provide a positive spring force against the translating sleeve shoulder 218, which may keep the flow tube main body 208 in a first position. The power spring 210 may also provide a positive spring force to return the flow tube main body 208 and the translating sleeve 222 to the first position (e.g., from a second position), as will be explained below.

The downhole device 200 may further include a nose spring 212 disposed between a translating sleeve assembly 230 and the flow tube shoulder 232. The translating sleeve assembly 230 may be disposed between and attached to a piston 220 and the translating sleeve 222. The power spring 210 and the nose spring 212 are depicted as coil springs in FIGS. 2A through 2F. However, the power spring 210 and the nose spring 212 may comprise any kind of spring and remain within the scope of the present disclosure, such as, for example, coil springs, wave springs, or fluid springs, among others.

In the illustrated embodiment, the translating sleeve assembly 230 may allow a force applied to a distal end of piston 220 to be transferred into translating sleeve 222. A force may be applied to the distal end of piston 220 by way of fluid communication from the channel 228 through the orifice 242. A force applied to piston 220 may move translating sleeve 222 from a first position to a second position. The nose spring 212 may provide a positive spring force against the translating sleeve assembly 230 and the flow tube shoulder 232, which may return the translating sleeve 222 from the second position to the first position, as will be discussed in greater detail below.

In the first closed position, the translating sleeve 222 and the flow tube main body 208 are positioned such that the translating sleeve shoulder 218 and the flow tube shoulder 232 are in contact and the power spring 210 and the nose spring 212 are in an extended position. In the first closed position, the translating sleeve 222 may be referred to as being in a first position and the flow tube 208 may be referred to as being in a first position.

In the first closed position, a valve 204 may be in a closed position, thereby isolating the lower section 202 from the flow tube main body 208. When the valve 204 is in a closed position, as in FIG. 2A, the valve 204 may prevent formation fluids and pressure from flowing into the flow tube main body 208 from the lower section 202. Although FIG. 2A illustrates the valve 204 as a flapper valve, the valve 204 may be any suitable type of valve such as a flapper type valve or a ball type valve, for example. As will be illustrated in further detail below, the valve 204 may be actuated into an open position to allow formation fluids to flow from the lower section 202 through the flow path 214 (e.g., defined by the lower section 202, an interior of the low tube main body 208 and an interior of the conduit 206).

When the downhole device 200 is in the first closed position, no amount of differential pressure across the valve 204 will allow formation fluids to flow from the lower section 202 into the flow path 214. In the first closed position, the downhole device 200 will only allow fluid flow from conduit 206 into the lower section 202, but not from the lower section 202 into the conduit 206. In the instance that pressure in the conduit 206 is increased, the valve 204 will remain in the closed position until the pressure in the conduit 206 is increased above the pressure in the lower section 202 plus the closing pressure provided by the flapper spring 205, sometimes referred to herein as valve opening pressure. When the valve opening pressure is reached, the valve 204 may open and allow fluid communication from the conduit 206 into the lower section 202. In this manner, treatment fluids such as surfactants, scale inhibitors, hydrate treatments, and other suitable treatment fluids may be introduced into the subterranean formation. The configuration of the downhole device 200 may allow treatment fluids to be pumped from a surface, such as a wellhead, into the subterranean formation without actuating a control line or balance line to open the valve. Once pressure in the conduit 206 is decreased below the valve opening pressure, the flapper spring 205 will return the valve 204 to the closed position, and thus flow from the conduit 206 into the lower section 202 will cease. When the valve 204 has returned to the closed position, flow from the lower section 202 into the flow path 214 will be prevented. Should a pressure differential across the valve 204 be reversed, such that pressure in the lower section 202 is greater than a pressure in the conduit 206, the valve 204 will remain in a closed position, such that fluids in the lower section 202 are prevented from flowing into the conduit 206.

The downhole device 200, in the illustrated embodiment, additionally includes an electromagnetic assembly 238. In the illustrated embodiment, the electromagnetic assembly 238 is electrically coupled to a power source 250 via an electrical connection 260, such as a tubing encapsulated conductor (TEC). In the illustrated embodiment, the power source 250 is a DC power source configured to deliver a constant voltage, as well as a DC current. In the illustrated embodiment, the DC power source is configured to deliver to the electromagnetic assembly 238 a constant 14 volts, as well as a DC current of 1.25 amps. It should be noted, as discussed above, as opposed to a DC power source, a DC power source with an AC signal laid thereover or an AC power source, could be used and remain within the scope of the present disclosure.

The downhole device 200, in the illustrated embodiment, further includes a sensor 270 coupled to the electromagnetic assembly 238. The sensor 270, as discussed above, may include various types of sensors and remain within the scope of the disclosure. In the illustrated embodiment, given that the power source is a DC power source, the sensor 270 is configured to sense for a change in a DC power parameter powering the electromagnetic assembly 238 (e.g., as the electromagnetic assembly 238 and magnetic target 234 physically couple to or physically decouple from one another), the sensed change representative of a change of impedance within a coil of the electromagnetic assembly 238 and employable to estimate the status or health of the downhole device 200. However, were an AC signal being used (e.g., whether a DC power source with an AC signal laid thereover or an AC power source), as discussed above, the sensor 270 would be configured to sense for a change in an AC signal parameter impart upon the electromagnetic assembly 238 (e.g., as the electromagnetic assembly and magnetic target physically couple to or physically decouple from one another), the sensed change again employable to estimate the status or health of the downhole device 200. As the power source 250 is turned off at the moment, as shown in a display 275 of the sensor 270, no voltage nor current is being sensed by the sensor 270.

Turning now to FIG. 2B, power (DC power) has now been delivered to the electromagnetic assembly 238 via the power source 250. As shown in the display 275 of the sensor 270, a constant 14 volts, and a DC current of 1.25 amps, is being delivered to the electromagnetic assembly 238. Furthermore, this DC power implies a resistance at the coil of the electromagnetic assembly 238 of 11.2 ohms. In at least this one embodiment, it is important that the power be delivered to the electromagnetic assembly 238 prior to the electromagnetic assembly 238 and magnetic target coming into contact with one another.

With reference to FIG. 2C, the downhole device 200 is illustrated in a second closed position. In the second closed position, the translating sleeve 222 may be displaced from the first position to a second position, which is relatively closer in proximity to the valve 204. The flow tube main body 208 may, however, remain in the first position. When the downhole device 200 is in the second closed position, both the power spring 210 and the nose spring 212 may be in a compressed state.

To move the translating sleeve 222 to the second position, differential pressure across the valve 204 may be increased by lowering pressure in the conduit 206 or increasing pressure in the lower section 202. Lowering pressure in the conduit 206 or increasing pressure in the lower section 202 will cause fluid from the lower section 202 to flow through the channel 228 defined between the sleeve 226 and the tubular housing 224 into the orifice 242. The orifice 242 may allow fluid communication into the piston tube 244, whereby the fluid pressure may act on the proximal end of the piston 220. The force exerted by the fluid pressure on the proximal end of the piston 220 may displace the piston 220 towards the valve 204, by transferring the force through the piston 220, the translating sleeve assembly 230, and the translating sleeve shoulder 218.

The nose spring 212 may provide a spring force against the flow tube shoulder 232 and the translating sleeve assembly 230, and the power spring 210 may provide a spring force against the translating sleeve shoulder 218 and the lower valve assembly 216. Although not illustrated in FIGS. 2A through 2F, the flow tube main body 208 may include channels that allow pressure and/or fluid communication between the flow path 214 and an interior of the sleeve 226. Collectively the spring forces from the power spring 210 and the nose spring 212 may resist the movement of the piston 220 until the differential pressure across the valve 204 is increased beyond the spring force provided from the power spring 210 and the nose spring 212. Increasing the differential pressure may include decreasing pressure in the flow tube 206, such that pressure in the lower section 202 is relatively higher than the pressure in the flow tube 206. When the differential pressure across the valve 204 is increased, the differential pressure across the piston 220 also increases. When the differential pressure across the valve 204 is increased beyond the spring force provided by the nose spring 212 and the power spring 210, the nose spring 212 and the power spring 210 may compress and allow the translating sleeve 222 to move into the second position. Differential pressure across the valve 204 may be increased by pumping fluid out of the conduit 206, for example. In the instance that the lower section 202 is fluidically coupled to a non-perforated section of pipe or where there is a plug in a conduit fluidically coupled to the lower section 202 that prevents pressure being transmitted from the lower section 202 to the piston 220, a pressure differential across the valve 204 may be induced through pipe swell.

In the second closed position, the downhole device 200 remains safe as no fluids from the lower section 202 can flow into the flow path 214. In the second closed position, no amount of differential pressure across the valve 204, the differential pressure being relatively higher pressure in the lower section 202 and relatively lower pressure in the conduit 206, should cause the valve 204 to open to allow fluids from the lower section 202 to flow into flow the path 214 as the pressure from the lower section 204 is acting on the valve 204. Unlike conventional safety valves, which generally require a control line to supply pressure to actuate a piston to move a translating sleeve, the downhole device 200 only requires pressure supplied by the wellbore fluids in the lower section 202 to move the translating sleeve.

With continued reference to FIG. 2C, the piston 236 may be fixedly attached to the translating sleeve assembly 230 and the electromagnet assembly 238. Although illustrated as two pistons in FIGS. 2A through 2F, the piston 236 may be an integral component of the piston 220. As illustrated, when the translating sleeve 222 is moved from the first position to the second position, the piston 236 and the electromagnet assembly 238 may also be moved, such that the electromagnetic assembly 238 is now in physical contact with the upper valve assembly 234 (e.g., which acts as the magnetic target). As the electromagnet assembly 238 is attached to the translating sleeve assembly 230 through the piston 236, when the electromagnet assembly 238 is switched on and fixed in place (e.g., like that shown in FIG. 2C), the translating sleeve assembly 230 and the translating sleeve 222 will also become fixed in place, thereby preventing the translating sleeve 222 from moving from the second position back to the first position, regardless of changes to the differential pressure across the valve 204. Advantageously, the electromagnetic assembly 238 may provide a means to hold the translating sleeve 222 at any well depth.

In FIGS. 2A through 2F, electromagnet assembly 238 is depicted as one coil circumscribing the translating sleeve assembly 230, but there may be any number of coils in any orientation to fix the translating sleeve assembly 230 in place. The electromagnet assembly 238 may apply a force in a substantially axial direction, for example. The force applied by the electromagnet assembly 238 may be any amount of force, including but not limited to, a force in a range of about 45 Newtons to about 45000 Newtons.

Hydraulic systems used in previous wellbore safety valves generally require control and balance lines to actuate and hold a valve open which may have pressure limitations. The limitations experienced by the hydraulic systems may be overcome by using the electromagnet assembly 230 described herein, as only well pressure is required to open the downhole device 200. Again, when the translating sleeve 222 is in the second position, either when the electromagnet assembly 238 is switched on or switched off, no amount of differential pressure across the valve 204 will open the valve 204, the differential pressure being a pressure difference between a relatively higher pressure in the section 202 and a relatively lower pressure in the conduit 206.

The embodiment of FIG. 2C illustrates the downhole device the moment that the electromagnetic assembly 238 contacts the magnetic target 234. As discussed above, the moment that the electromagnetic assembly 238 contacts the magnetic target 234, the changing magnetic field within the magnetic target 234 generates a CEMF. For instance, before contact (e.g., FIG. 2B) there was little or no magnetic field in the magnetic target 234. Similarly, after prolonged contact (e.g., FIG. 2D) there is a fixed large amount of magnetic field in the magnetic target 234. However, at the moment of contact there is a changing amount of magnetic field in the magnetic target 234, which thus generates the CEMF. In the above example embodiment (e.g., as shown in the display 275 of the sensor 270), given the constant 14 volts, at the moment of contact the current drops to approximately 1.017 amps, which implies that the resistance in the coil(s) of the electromagnetic assembly is now approximately 13.77 ohms.

Turning to FIG. 2D, illustrated is the downhole device 200 of FIG. 2C after a prolonged period of time that the electromagnetic assembly 238 and the magnetic target 234 are in contact with one another. After the magnetic field has stabilized in the magnetic target 234, the current and the impedance in the coil(s) return to the original values (e.g., or at least really close to them). Accordingly, as shown in the display 275 of the sensor 270, a constant 14 volts, and a DC current of 1.25 amps, is being delivered to the electromagnetic assembly 238. Furthermore, this DC power again implies a resistance at the coil of the electromagnetic assembly 238 of 11.2 ohms.

With reference to FIG. 2E, the downhole device 200 is illustrated in an open position. When the downhole device 200 is in the open position, the translating sleeve 222 may be fixed in place in the second position (e.g., as shown in FIG. 2C) through the force provided by the electromagnet assembly 238, the force being transferred through the piston 236 to the translating sleeve assembly 230. The flow tube main body 208 is illustrated as being axially shifted from the first position illustrated in FIGS. 2A through 2D, to a second position in FIG. 2E. When the flow tube main body 208 is in the second position, the flow tube shoulder 232 and the translating sleeve shoulder 218 may be in contact, and the flow tube main body 208 may have displaced the valve 204 into an open position. Additionally, the nose spring 212 may be in an uncompressed state while the power spring 210 may be in a compressed state.

The flow tube main body 208 may be moved from the first position to the second position when the translating sleeve 222 is fixed in place in the second position by the electromagnet assembly 238, as described above. When the translating sleeve 222 is fixed in the second position through the force provided by the electromagnet assembly 238, the nose spring 212 may provide a positive spring force against the flow tube shoulder 232 and the translating sleeve assembly 230. The positive spring force from the nose spring 212 may be transferred through the flow tube main body 208 into the valve 204. The flow tube main body 208 will not move to the second position until differential pressure across the valve 204 is decreased and the translating sleeve 222 is fixed in position. Differential pressure may be decreased by pumping into the conduit 206, thereby increasing the pressure in the conduit 206. Pressure may be increased in the conduit 206 until the differential pressure across the valve 204 is decreased to a point where the positive spring force from the nose spring 212 is greater than the differential pressure across the valve 204. Thereafter, the nose spring 212 may extend and move the flow tube main body 208 into the second position by acting on the translating sleeve assembly 230 and the flow tube shoulder 232. When the flow tube main body 208 is in the second position, fluids such as oil and gas in the lower section 202 may be able to flow into the flow path 214 and to a surface of the wellbore such as to a wellhead. The downhole device 200 may remain in the open position, defined by the translating sleeve 222 being in the second position and the flow tube 208 being in the second position, as long as the electromagnet assembly 238 remains powered on.

With reference to FIG. 2F, the downhole device 200 may be moved back to the first closed position by cutting power to the electromagnet assembly 238. As previously discussed, the electromagnet assembly 238 may fix the translating sleeve assembly 230 in place in the second position when the electromagnet assembly 238 remains powered on. When electromagnet assembly 238 is powered off, the translating sleeve assembly 230 may no longer be fixed in place. The power spring 210 may provide a positive spring force against the lower valve assembly 216, the translating sleeve shoulder 218, and the flow tube shoulder 232 through contact between the translating sleeve shoulder 218 and the flow tube shoulder 232. The positive spring force from the power spring 210 may axially displace the translating sleeve 222 to the first position and the flow tube main body 208 to the first position, thereby returning the downhole device 200 to the first closed position illustrated in FIG. 2F. The positive spring force from the power spring 210 may axially displace the electromagnet assembly 238 to the position illustrated in FIG. 2F by transmitting the positive spring force through the piston 236.

A process control system may be utilized to monitor and control production of formation fluids from a well where the SSSV is disposed. A process control system may include components such as flowmeters, pressure transducers, pumps, power systems, and associated controls system for each. The process control system may provide power to the downhole device 200 to turn on and off the electromagnet assembly therein. The electromagnet assembly may be designed to run off any power source such as a direct current ("DC") power source or an alternating current ("AC") power source. The process control system may allow an operator to open the downhole device 200 by the methods described above by using the pump to reduce pressure, powering the electromagnet assembly, and using the pump to increase pressure. Wellbore fluid pressures and flow rates may be monitored by the process control system to ensure safe operating conditions and that the production process does not exceed safety limitations. Should a process upset occur such as an overpressure event, the process control system may detect the process upset and automatically cut power to the downhole device 200. As discussed above, cutting power to the downhole device 200 may cause the downhole device 200 to automatically close thereby containing pressures and fluids.

Thus, in the embodiment of FIGS. 2A through 2F, the downhole device 200 was operated, as well as the status and/or health of the downhole device 200 was estimated. For example, the downhole device 200 was run-in-hole as shown in FIG. 2A, and then power was delivered to the electromagnetic assembly 238 as shown in FIG. 2B. Thereafter, the downhole device 200 was cycled, such as shown in FIGS. 2C and 2D, such that the electromagnetic assembly 238 coupled with the magnetic target 234. During the cycling process, the sensor 270 is sensing for the change in the DC power parameter, which is representative of a change of impedance within the coil of the electromagnetic assembly 238. A sensed change in current or increase in impedance would indicate that the electromagnetic assembly 238 has contacted the magnetic target 234. However, no sensed change in current or increase in impedance would indicate that the electromagnetic assembly 238 has not contacted the magnetic target 234.

Figure 3:
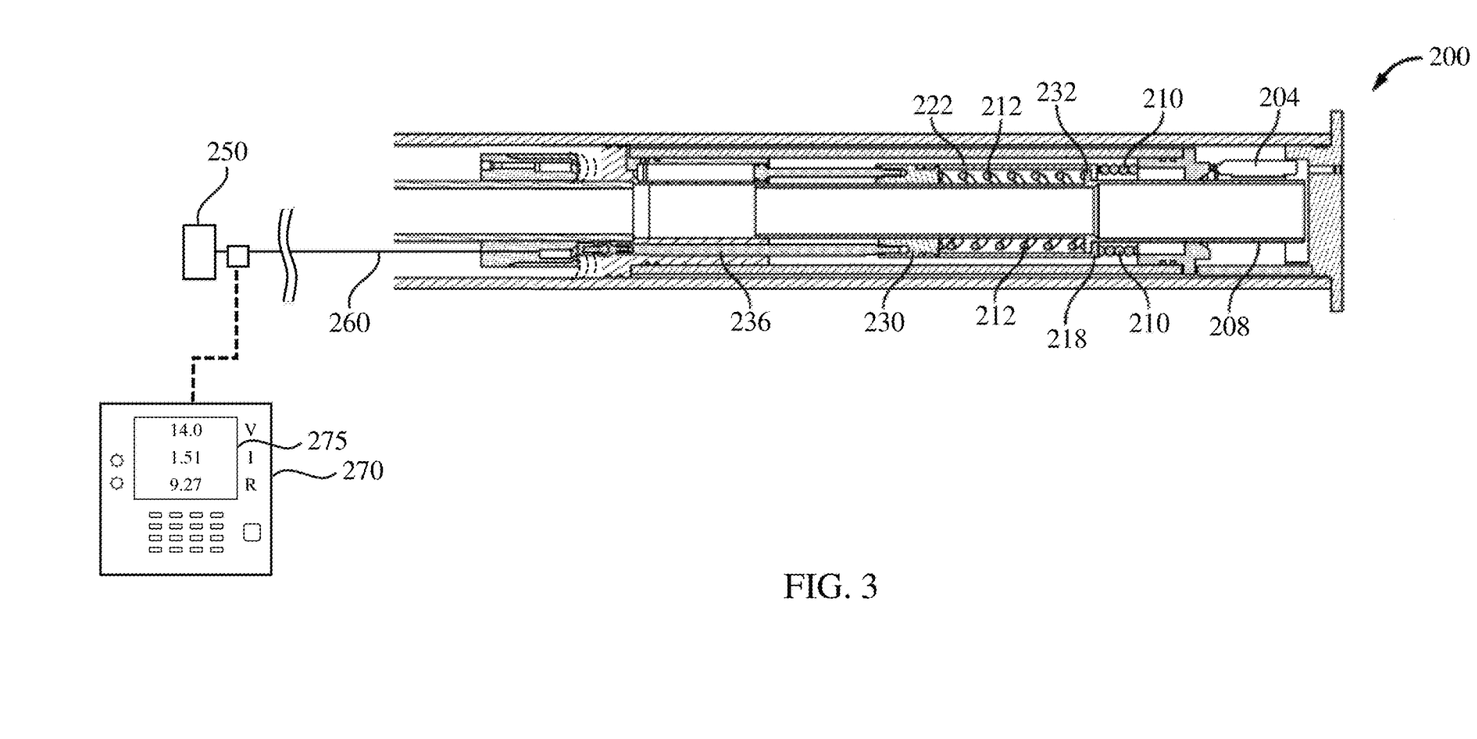
FIG. 3 illustrates the downhole device of FIG. 2E, wherein the electromagnetic assembly is still being powered, or at least the power source is still sending power toward the electromagnetic assembly, but the electromagnetic assembly and the magnetic target start to decouple from one another.

Turning briefly to FIG. 3, illustrated is the downhole device 200 of FIG. 2E, wherein the electromagnetic assembly 238 is still being powered, or at least the power source 250 is still sending power toward the electromagnetic assembly 238, but the electromagnetic assembly 238 and the magnetic target 234 start to decouple from one another. This may occur for a number of different reasons, and typically would not be known or quickly known to the user of the downhole device 200.

The inventive aspects of the present disclosure, however, would sense the change in impedance of the coil of the electromagnetic assembly 238, and would immediately know that the electromagnetic assembly 238 and magnetic target 234 decoupled from one another. For example, as shown in the display 275 of the sensor 270, the sensor 270 would sense a spike in current (e.g., a spike to about 1.51 amps), which is indicative of the decoupling of the two features. Accordingly, not only can the inventive aspects of the present disclosure detect when the electromagnetic assembly 238 couples with the magnetic target 234 (e.g., as shown in FIGS. 2A through 2F), but the inventive aspects of the present disclosure may also detect when the electromagnetic assembly 238 unintentionally decouples from the magnetic target 234 (e.g., as shown in FIG. 3)

Aspects disclosed herein include:

A. A downhole device, the downhole device including: 1) an electromagnetic assembly; 2) a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and 3) a sensor electrically coupled to the electromagnetic assembly, the sensor configured to sense for a change in a DC power parameter powering the electromagnetic assembly as the electromagnetic assembly and magnetic target physically couple to or physically decouple from one another, the sensed change representative of a change of impedance within a coil of the electromagnetic assembly and employable to estimate the status or health of the downhole device.

B. A well system, the well system including: 1) a wellbore extending through one or more subterranean formations; and 2) a downhole device located within the wellbore, the downhole device including: a) an electromagnetic assembly; and b) a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and 3) a sensor electrically coupled to the electromagnetic assembly, the sensor configured to sense for a change in a DC power parameter powering the electromagnetic assembly as the electromagnetic assembly and magnetic target physically couple to or physically decouple from one another, the sensed change representative of a change of impedance within a coil of the electromagnetic assembly and employable to estimate the status or health of the downhole device.

C. A method, the method including: 1) positioning a downhole device within a wellbore extending through one or more subterranean formations, the downhole device including: a) an electromagnetic assembly; and b) a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target, wherein a sensor is electrically coupled to the electromagnetic assembly; 2) applying DC power to the electromagnetic assembly via a DC power source; and 3) sensing for a change in a DC power parameter of the applied DC power as the electromagnetic assembly and magnetic target physically couple to or physically decouple from one another, the sensed change representative of a change of impedance within a coil of the electromagnetic assembly and employable to estimate the status or health of the downhole device.

D. A downhole device, the downhole device including: 1) an electromagnetic assembly; a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and b) a sensor electrically coupled to the electromagnetic assembly, the sensor configured to sense for a change in an AC signal parameter impart upon the electromagnetic assembly as the electromagnetic assembly and magnetic target physically couple to or physically decouple from one another, the sensed change employable to estimate the status or health of the downhole device.

E. A well system, the well system including: 1) a wellbore extending through one or more subterranean formations; and 2) a downhole device located within the wellbore, the downhole device including: a) an electromagnetic assembly; and b) a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and 3) a sensor electrically coupled to the electromagnetic assembly, the sensor configured to sense for a change in an AC signal parameter impart upon the electromagnetic assembly as the electromagnetic assembly and magnetic target physically couple to or physically decouple from one another, the sensed change employable to estimate the status or health of the downhole device.

F. A method, the method including: 1) positioning a downhole device within a wellbore extending through one or more subterranean formations, the downhole device including: a) an electromagnetic assembly; and b) a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target, wherein a sensor is electrically coupled to the electromagnetic assembly; 2) applying an AC signal to the electromagnetic assembly via an AC signal source; and 3) sensing for a change in an AC signal parameter of the applied AC signal as the electromagnetic assembly and magnetic target physically couple to or physically decouple from one another, the sensed change employable to estimate the status or health of the downhole device.

Aspects A, B, C, D, E and F may have one or more of the following additional elements in combination: Element 1: wherein the sensor is a current sensor, the current sensor configured to sense for a change in current a moment the electromagnetic assembly and the magnetic target physically couple to one another, the sensed change in current indicating that the electromagnetic assembly has engaged with the magnetic target. Element 2: wherein the sensor is a current sensor, the current sensor configured to sense for a change in current a moment the electromagnetic assembly and the magnetic target physically decouple from one another, the sensed change in current indicating that the electromagnetic assembly has disengaged from the magnetic target. Element 3: wherein the sensor is a power sensor, the power sensor configured to sense for a change in power a moment the electromagnetic assembly and the magnetic target physically couple to one another, the sensed change in power indicating that the electromagnetic assembly has engaged with the magnetic target. Element 4: wherein the sensor is a power sensor, the power sensor configured to sense for an increase in power a moment the electromagnetic assembly and the magnetic target physically decouple from one another, the sensed increase in power indicating that the electromagnetic assembly has disengaged from the magnetic target. Element 5: further including: a tubular housing surrounding the electromagnetic assembly and the magnetic target; a flow tube positioned within the tubular housing; and a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target. Element 6: wherein the magnetic target is coupled with the movable flow tube and the electromagnetic assembly is coupled with the stationary tubular housing. Element 7: wherein the electromagnetic assembly is coupled with the movable flow tube and the magnetic target is coupled with the stationary tubular housing. Element 8: further including a DC power source coupled with the electromagnetic assembly. Element 9: wherein the DC power source is coupled with the electromagnetic assembly via a tubing encapsulated conductor (TEC). Element 10: wherein the sensor is a current sensor, the current sensor configured to sense for a change in current a moment the electromagnetic assembly and the magnetic target physically couple to one another, the sensed change in current indicating that the electromagnetic assembly has engaged with the magnetic target. Element 11: wherein the sensor is a current sensor, the current sensor configured to sense for an increase in current a moment the electromagnetic assembly and the magnetic target physically decouple from one another, the sensed increase in current indicating that the electromagnetic assembly has disengaged from the magnetic target. Element 12: wherein the sensor is a power sensor, the power sensor configured to sense for a change in power a moment the electromagnetic assembly and the magnetic target physically couple to one another, the sensed change in power indicating that the electromagnetic assembly has engaged with the magnetic target. Element 13: wherein the sensor is a power sensor, the power sensor configured to sense for an increase in power a moment the electromagnetic assembly and the magnetic target physically decouple from one another, the sensed increase in power indicating that the electromagnetic assembly has disengaged from the magnetic target. Element 14: further including: a tubular housing surrounding the electromagnetic assembly and the magnetic target; a flow tube positioned within the tubular housing; and a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target. Element 15: wherein the magnetic target is coupled with the movable flow tube and the electromagnetic assembly is coupled with the stationary tubular housing. Element 16: wherein the electromagnetic assembly is coupled with the movable flow tube and the magnetic target is coupled with the stationary tubular housing. Element 17: further including a DC power source coupled with the electromagnetic assembly. Element 18: wherein the DC power source is coupled with the electromagnetic assembly via a tubing encapsulated conductor (TEC). Element 19: wherein the sensor is located outside of the wellbore. Element 20: wherein the electromagnetic assembly is an only downhole electronic of the downhole device. Element 22: wherein the sensor is a voltage sensor, the voltage sensor configured to sense for a change in induced voltage a moment the electromagnetic assembly and the magnetic target physically couple to one another, the change in induced voltage indicating that the electromagnetic assembly has engaged with the magnetic target. Element 23: wherein the change in induced voltage is a first change in induced voltage, the sensor configured to sense for a second change in induced voltage a moment the electromagnetic assembly and the magnetic target physically decouple from one another, the second change in induced voltage indicating that the electromagnetic assembly has disengaged from the magnetic target. Element 24: wherein the sensor is an eddy current sensor, the eddy current sensor configured to sense for an eddy current a moment the electromagnetic assembly and the magnetic target physically couple to one another, the sensed eddy current indicating that the electromagnetic assembly has engaged with the magnetic target. Element 25: wherein the eddy current sensor is configured to sense for a change in eddy current a moment the electromagnetic assembly and the magnetic target physically decouple from one another, the sensed change in eddy current indicating that the electromagnetic assembly has disengaged from the magnetic target. Element 26: further including: a tubular housing surrounding the electromagnetic assembly and the magnetic target; a flow tube positioned within the tubular housing; and a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target. Element 27: wherein the magnetic target is coupled with the movable flow tube and the electromagnetic assembly is coupled with the stationary tubular housing. Element 28: wherein the electromagnetic assembly is coupled with the movable flow tube and the magnetic target is coupled with the stationary tubular housing. Element 29: further including an AC signal source coupled with the electromagnetic assembly. Element 30: wherein the AC signal source is coupled with the electromagnetic assembly via a tubing encapsulated conductor (TEC). Element 31: wherein the sensor is a voltage sensor, the voltage sensor configured to sense for a change in induced voltage a moment the electromagnetic assembly and the magnetic target physically couple to one another, the change in induced voltage indicating that the electromagnetic assembly has engaged with the magnetic target. Element 32: wherein the change in induced voltage is a first change in induced voltage, the sensor configured to sense for a second change in induced voltage a moment the electromagnetic assembly and the magnetic target physically decouple from one another, the second change in induced voltage indicating that the electromagnetic assembly has disengaged from the magnetic target. Element 33: wherein the sensor is an eddy current sensor, the eddy current sensor configured to sense for an eddy current a moment the electromagnetic assembly and the magnetic target physically couple to one another, the sensed eddy current indicating that the electromagnetic assembly has engaged with the magnetic target. Element 34: wherein the eddy current sensor is configured to sense for a change in eddy current a moment the electromagnetic assembly and the magnetic target physically decouple from one another, the sensed change in eddy current indicating that the electromagnetic assembly has disengaged from the magnetic target. Element 35: further including: a tubular housing surrounding the electromagnetic assembly and the magnetic target; a flow tube positioned within the tubular housing; and a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target. Element 36: wherein the magnetic target is coupled with the movable flow tube and the electromagnetic assembly is coupled with the stationary tubular housing. Element 37: wherein the electromagnetic assembly is coupled with the movable flow tube and the magnetic target is coupled with the stationary tubular housing. Element 38: further including an AC signal source coupled with the electromagnetic assembly. Element 39: wherein the AC signal source is coupled with the electromagnetic assembly via a tubing encapsulated conductor (TEC). Element 40: wherein the sensor is located outside of the wellbore. Element 41: wherein the electromagnetic assembly is an only downhole electronic of the downhole device.

Those skilled in the art to which this application relates will appreciate that other and further additions, deletions, substitutions and modifications may be made to the described embodiments.

What is claimed is:

1. A downhole device, comprising:
   an electromagnetic assembly;
   a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and
   a sensor electrically coupled to the electromagnetic assembly, the sensor configured to sense for a change in a DC power parameter powering the electromagnetic assembly as the electromagnetic assembly and magnetic target physically couple to or physically decouple from one another, the sensed change representative of a change of impedance within a coil of the electromagnetic assembly and employable to estimate the status or health of the downhole device.

2. The downhole device as recited in claim 1, wherein the sensor is a current sensor, the current sensor configured to sense for a change in current a moment the electromagnetic assembly and the magnetic target physically couple to one another, the sensed change in current indicating that the electromagnetic assembly has engaged with the magnetic target.

3. The downhole device as recited in claim 1, wherein the sensor is a current sensor, the current sensor configured to sense for a change in current a moment the electromagnetic assembly and the magnetic target physically decouple from one another, the sensed change in current indicating that the electromagnetic assembly has disengaged from the magnetic target.

4. The downhole device as recited in claim 1, wherein the sensor is a power sensor, the power sensor configured to sense for a change in power a moment the electromagnetic assembly and the magnetic target physically couple to one another, the sensed change in power indicating that the electromagnetic assembly has engaged with the magnetic target.

5. The downhole device as recited in claim 1, wherein the sensor is a power sensor, the power sensor configured to sense for an increase in power a moment the electromagnetic assembly and the magnetic target physically decouple from one another, the sensed increase in power indicating that the electromagnetic assembly has disengaged from the magnetic target.

6. The downhole device as recited in claim 1, further including:
   a tubular housing surrounding the electromagnetic assembly and the magnetic target;
   a flow tube positioned within the tubular housing; and
   a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target.

7. The downhole device as recited in claim 6, wherein the magnetic target is coupled with the movable flow tube and the electromagnetic assembly is coupled with the stationary tubular housing.

8. The downhole device as recited in claim 6, wherein the electromagnetic assembly is coupled with the movable flow tube and the magnetic target is coupled with the stationary tubular housing.

9. The downhole device as recited in claim 1, further including a DC power source coupled with the electromagnetic assembly.

10. The downhole device as recited in claim 9, wherein the DC power source is coupled with the electromagnetic assembly via a tubing encapsulated conductor (TEC).

11. A well system, comprising:
- a wellbore extending through one or more subterranean formations; and
- a downhole device located within the wellbore, the downhole device including:
  - an electromagnetic assembly; and
  - a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target; and
- a sensor electrically coupled to the electromagnetic assembly, the sensor configured to sense for a change in a DC power parameter powering the electromagnetic assembly as the electromagnetic assembly and magnetic target physically couple to or physically decouple from one another, the sensed change representative of a change of impedance within a coil of the electromagnetic assembly and employable to estimate the status or health of the downhole device.

12. The well system as recited in claim 11, wherein the sensor is a current sensor, the current sensor configured to sense for a change in current a moment the electromagnetic assembly and the magnetic target physically couple to one another, the sensed change in current indicating that the electromagnetic assembly has engaged with the magnetic target.

13. The well system as recited in claim 11, wherein the sensor is a current sensor, the current sensor configured to sense for an increase in current a moment the electromagnetic assembly and the magnetic target physically decouple from one another, the sensed increase in current indicating that the electromagnetic assembly has disengaged from the magnetic target.

14. The well system as recited in claim 11, wherein the sensor is a power sensor, the power sensor configured to sense for a change in power a moment the electromagnetic assembly and the magnetic target physically couple to one another, the sensed change in power indicating that the electromagnetic assembly has engaged with the magnetic target.

15. The well system as recited in claim 11, wherein the sensor is a power sensor, the power sensor configured to sense for an increase in power a moment the electromagnetic assembly and the magnetic target physically decouple from one another, the sensed increase in power indicating that the electromagnetic assembly has disengaged from the magnetic target.

16. The well system as recited in claim 11, further including:
- a tubular housing surrounding the electromagnetic assembly and the magnetic target;
- a flow tube positioned within the tubular housing; and
- a valve closure mechanism positioned within the tubular housing, the flow tube configured to move between a closed position and an open position and thereby move the valve closure mechanism between a closed state and an open state, the flow tube configured to move to physically couple or physically decouple the electromagnetic assembly and the magnetic target.

17. The well system as recited in claim 16, wherein the magnetic target is coupled with the movable flow tube and the electromagnetic assembly is coupled with the stationary tubular housing.

18. The well system as recited in claim 16, wherein the electromagnetic assembly is coupled with the movable flow tube and the magnetic target is coupled with the stationary tubular housing.

19. The well system as recited in claim 11, further including a DC power source coupled with the electromagnetic assembly.

20. The well system as recited in claim 19, wherein the DC power source is coupled with the electromagnetic assembly via a tubing encapsulated conductor (TEC).

21. The well system as recited in claim 11, wherein the sensor is located outside of the wellbore.

22. The well system as recited in claim 21, wherein the electromagnetic assembly is an only downhole electronic of the downhole device.

23. A method, comprising:
- positioning a downhole device within a wellbore extending through one or more subterranean formations, the downhole device including:
  - an electromagnetic assembly; and
  - a magnetic target positioned proximate the electromagnetic assembly, wherein one of the magnetic target or the electromagnetic assembly is coupled with a movable feature of the downhole device, the movable feature configured to move to physically couple or physically decouple the electromagnetic assembly and the magnetic target, wherein a sensor is electrically coupled to the electromagnetic assembly;
- applying DC power to the electromagnetic assembly via a DC power source; and
- sensing for a change in a DC power parameter of the applied DC power as the electromagnetic assembly and magnetic target physically couple to or physically decouple from one another, the sensed change representative of a change of impedance within a coil of the electromagnetic assembly and employable to estimate the status or health of the downhole device.

* * * * *